(12) United States Patent
Loszewski et al.

(10) Patent No.: US 8,323,549 B2
(45) Date of Patent: Dec. 4, 2012

(54) TECHNIQUES FOR FORMING TEMPORARY PROTECTIVE COATINGS AND BONDABLE SURFACES

(75) Inventors: Raymond C. Loszewski, Windham, NH (US); Daniel P. DeSantis, Billerica, MA (US)

(73) Assignee: Textron Systems Corporation, Wilmington, MA (US)

( * ) Notice: Subject to any disclaimer, the term of this patent is extended or adjusted under 35 U.S.C. 154(b) by 434 days.

(21) Appl. No.: 12/619,218

(22) Filed: Nov. 16, 2009

(65) Prior Publication Data

US 2010/0124660 A1    May 20, 2010

Related U.S. Application Data

(60) Provisional application No. 61/115,407, filed on Nov. 17, 2008.

(51) Int. Cl.
*B32B 3/12* (2006.01)
*B32B 19/00* (2006.01)
*B32B 7/06* (2006.01)

(52) U.S. Cl. ........ 264/257; 264/265; 264/317; 156/289; 156/323

(58) Field of Classification Search .................. 264/257, 264/264–265, 317; 156/289, 323, 701
See application file for complete search history.

(56) References Cited

U.S. PATENT DOCUMENTS

| 1,608,727 | A | * | 11/1926 | Dickey | 428/71 |
| 2,304,632 | A | | 12/1942 | Faelten | |
| 2,352,194 | A | * | 6/1944 | Grabec | 264/156 |
| 2,981,612 | A | | 4/1961 | Bowman | |
| 3,210,233 | A | | 10/1965 | Kummer et al. | |
| 3,475,262 | A | | 10/1969 | Sargent et al. | |
| 3,616,063 | A | * | 10/1971 | Bradley | 156/425 |
| 3,617,416 | A | | 11/1971 | Kromrey | |
| 3,787,546 | A | * | 1/1974 | Pratt et al. | 264/156 |
| 4,857,380 | A | | 8/1989 | Kent | |
| 4,938,912 | A | * | 7/1990 | Pelzer | 264/504 |
| 5,005,731 | A | | 4/1991 | Koehler et al. | |
| 5,131,970 | A | * | 7/1992 | Potter et al. | 156/205 |
| 5,567,500 | A | | 10/1996 | Marshall et al. | |

(Continued)

FOREIGN PATENT DOCUMENTS

BE    1003784 A4    6/1992

(Continued)

OTHER PUBLICATIONS

"Hysol Surface Preparation Guide," Loctite Aerospace, Loctitie Corporation, Rev. Jan. 2001, pp. 1-11.
Sabreen, Scott, "Surface Wetting & Pretreatment Methods," The Sabreen Group, Inc., pp. 1-2.

(Continued)

*Primary Examiner* — Joseph Del Sole
*Assistant Examiner* — Nahida Sultana
(74) *Attorney, Agent, or Firm* — BainwoodHuang (57) ABSTRACT

A method for forming temporary protective coatings and bondable surfaces is disclosed. In the method, a soluble layer is disposed on a material surface, such as the interior surfaces of cell walls of a web material. The soluble material is then removed or leached from the web material to form and expose a roughly textured, bondable surface for bonding with another material, such as AVCOAT insulation. Use of the soluble layer, therefore, enhances the bondability of any surface that requires good adhesion, such as where the surface is difficult to reach for conventional surface preparation techniques.

10 Claims, 7 Drawing Sheets

U.S. PATENT DOCUMENTS

| | | | |
|---|---|---|---|
| 5,632,940 A * | 5/1997 | Whatley | 264/46.4 |
| 5,730,920 A | 3/1998 | Marshall et al. | |
| 5,863,333 A | 1/1999 | Kato et al. | |
| 5,981,205 A | 11/1999 | Hemmings et al. | |
| 6,605,326 B2 | 8/2003 | Sherwood | |
| 7,332,116 B2 * | 2/2008 | Petervary et al. | 264/156 |
| 7,347,961 B2 * | 3/2008 | Obrachta et al. | 264/156 |
| 7,452,585 B1 * | 11/2008 | Wong et al. | 428/117 |
| 8,088,316 B2 * | 1/2012 | Muth et al. | 264/156 |
| 2002/0109257 A1 * | 8/2002 | Gaidjiergis et al. | 264/156 |
| 2005/0089707 A1 * | 4/2005 | Obeshaw | 428/593 |
| 2007/0009709 A1 | 1/2007 | Krishnan et al. | |

FOREIGN PATENT DOCUMENTS

| | | |
|---|---|---|
| FR | 1056877 A | 3/1954 |
| FR | 1596868 A | 6/1970 |
| WO | 91/14565 A | 10/1991 |

OTHER PUBLICATIONS

International Search Report for PCT/US2009/033338, mailed Dec. 11, 2009.

International Search Report and Written Opinion from PCT/US2009/064582, mailed Mar. 15, 2010.

* cited by examiner

TECHNIQUES FOR FORMING TEMPORARY PROTECTIVE COATINGS AND BONDABLE SURFACES

CROSS REFERENCE TO RELATED APPLICATIONS

This Patent Application claims priority to U.S. Provisional Patent Application No. 61/115,407 filed on Nov. 17, 2008, entitled, "TECHNIQUES FOR FORMING CELL-WALL STRUCTURE FOR HONEYCOMB HEAT SHIELD", the contents and teachings of which are hereby incorporated by reference in their entirety.

BACKGROUND

Honeycomb structures are configured to meet design requirements for particular structural components, such as used in high temperature and highly stressed environments. As a structural core material, honeycomb structures can be used in different types of aerospace vehicles and supporting equipment. For example, panels formed with an underlying honeycomb structure, as used in the aerospace industry, provide aerospace vehicles and supporting equipment with minimum weight qualities, relatively high heat shielding properties, aerodynamically smooth surfaces, and relatively high fatigue-resistant structural qualities.

In one conventional aerospace industry application, the honeycomb structure is utilized as an underlying structural component of a heat shield. For example, in such an application, the honeycomb structure is formed of a fiberglass reinforced nylon phenolic material filled with AVCOAT insulation, a mid-density, syntactic, silica-phenolic foam material, available from Textron Systems Corp. of Wilmington, Mass. In this application, the fiberglass reinforced nylon phenolic material defines a plurality of individual cells that form the honeycomb cell walls with the AVCOAT insulation residing within each honeycomb cell.

To create the honeycomb structure, an assembler places a layer of raw nylon phenolic material on a table having a series of precisely spaced parallel slots. The assembler then positions a set of metal pins or mandrels over the material and pushes the pins into the slots so that the material conforms to the contours of the table. The pins are formed of a steel or aluminum material having hexagonal cross-sections and are coated with a release agent to facilitate removal of the pins, as described below. Next, the assembler places a second layer of raw nylon phenolic material over the first row of metal pins and disposes a second row of pins over the second layer of material and inserts the second set of pins into the slots formed by the underlying first row of pins. The assembler can then add additional, alternating layers of nylon phenolic material and pins to the base to build the thickness of the overall honeycomb structure to a particular thickness. The assembler then applies pressure and/or heat to the resulting structure in order to consolidate and cure resin matrix carried by the material layers of the structure.

Once the curing process has been completed, the assembler removes the pins from the hardened material layers to provide a honeycomb structure having hexagonally-shaped cells. The assembler then cleans the honeycomb structure, such as by using a plasma cleaning process, to remove contaminants, such as residual mold release agents, from the structure. The assembler then manually fills each cell with AVCOAT insulation, such as AVCOAT 5026-39, using a device similar to a caulking gun. The assembler then manually inspects and X-rays the resulting structure to confirm proper fabrication and to ensure that the AVCOAT insulation has as substantially consistent density within the honeycomb cells.

SUMMARY

When a manufacturer injects each cell of the honeycomb structure with the AVCOAT insulation, it is important that the AVCOAT material adequately bonds to the cell walls of each cell in order to form a unitized structure having good mechanical properties and to minimize rapid disintegration of the heat shield during use. In order to provide adequate bonding between the honeycomb structure and the AVCOAT insulation, during the manufacturing process, the assembler engages in additional processing steps with respect to the honeycomb structure prior to injecting the AVCOAT insulation.

For example, as indicated above, when forming the honeycomb structure, the manufacturer coats each pin with a release agent to allow removal of the pins after the honeycomb structure has hardened. However, in certain cases, when the manufacturer removes the pins from the hardened honeycomb structure, the pins can leave behind cell wall structures having a relatively smooth surface finish that can also be contaminated with residual mold release, both of which may interfere with proper adhesion between the honeycomb structure and the AVCOAT insulation. While the manufacturer can employ various surface preparation techniques such as a chemical etching process or a mechanical sanding process to roughen the cell wall, such an etching or sanding process can produce variable results due to inaccessibility of portions of the cell walls, such as between adjacent faces of the cell walls. As a result, the filler material (e.g., AVCOAT insulation) may not adequately bond with the honeycomb structure, leading to poor mechanical properties and degradation or and failure of the material. Traditionally, the manufacturer can integrate nylon peel-plies into each layer of raw nylon phenolic material during manufacturing to create a roughly textured surface when the peel-ply is stripped away prior to bonding. However, the nylon peel-plies are typically formed of non-leachable fabrics that are not amenable to being removed from tight spaces such as from the inside of honeycomb cell walls.

Additionally, as indicated above, when forming the honeycomb structure, the manufacturer coats each pin with a mold release agent to allow removal of the pins after the honeycomb structure has hardened. Once the manufacturer has removed the pins, to remove residual mold release material that may be present on the cell walls of the web structure, the manufacturer cleans the cell walls via a solvent washing or plasma cleaning process. These processes can provide variable results due to incomplete removal or the inaccessibility of certain portions of the cell walls. As a result, the filler material (e.g., AVCOAT insulation) may not adequately bond with the honeycomb structure, leading to low strength and degradation or failure of the material.

Embodiments of the present invention relate to a method for forming temporary protective coatings and bondable surfaces. In the method, a soluble layer is disposed on a material surface, such as the interior surfaces of cell walls of a web material. The soluble material is then removed or leached from the web material to form and expose a bondable surface for bonding with another material, such as AVCOAT insulation. For example, in one arrangement, an assembler applies a leachable or soluble coating to a set of pins or mandrels prior to using the pins to mold the web material into cells that form a web structure. When the assembler dissolve the soluble coating from the surface of the web material, such as in a washing process, such dissolution forms and exposes a roughly textured surface of the web material, ready for bonding with another material, such as a filler material. Use of the soluble layer, therefore, enhances the bondability of any surface that requires good adhesion, such as where the surface is difficult to reach for conventional surface preparation techniques, such as sanding or chemical etching. In one arrangement, the soluble coating reacts with a resin matrix carried by the web material or with a chemical coupling agent to provide dangling functional groups that can further enhance adhesion with the filler material.

Embodiments of the invention relate to a method for forming a web structure is disclosed. The method includes disposing a soluble coating on a cell wall defined by a web material, the web material configured in first physical state, converting the first physical state of the web material to a second physical state to create the web structure, and removing the soluble coating from the cell wall of the web structure to expose a textured bonding surface of the cell wall.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention relate to a method for forming temporary protective coatings and bondable surfaces. In the method, a soluble layer is disposed on a material surface, such as the interior surfaces of cell walls of a web material. The soluble material is then removed or leached from the web material to form and expose a bondable surface for bonding with another material, such as AVCOAT insulation. For example, in one arrangement, an assembler applies a leachable or soluble coating to a set of pins or mandrels prior to using the pins to mold the web material into cells that form a web structure. When the assembler dissolve the soluble coating from the surface of the web material, such as in a washing process, such dissolution forms and exposes a roughly textured surface of the web material, ready for bonding with another material, such as a filler material. Use of the soluble layer, therefore, enhances the bondability of any surface that requires good adhesion, such as where the surface is difficult to reach for conventional surface preparation techniques, such as sanding or chemical etching. In one arrangement, the soluble coating reacts with a resin matrix carried by the web material or with a chemical coupling agent to provide dangling functional groups that can further enhance adhesion with the filler material.

Figure 1:
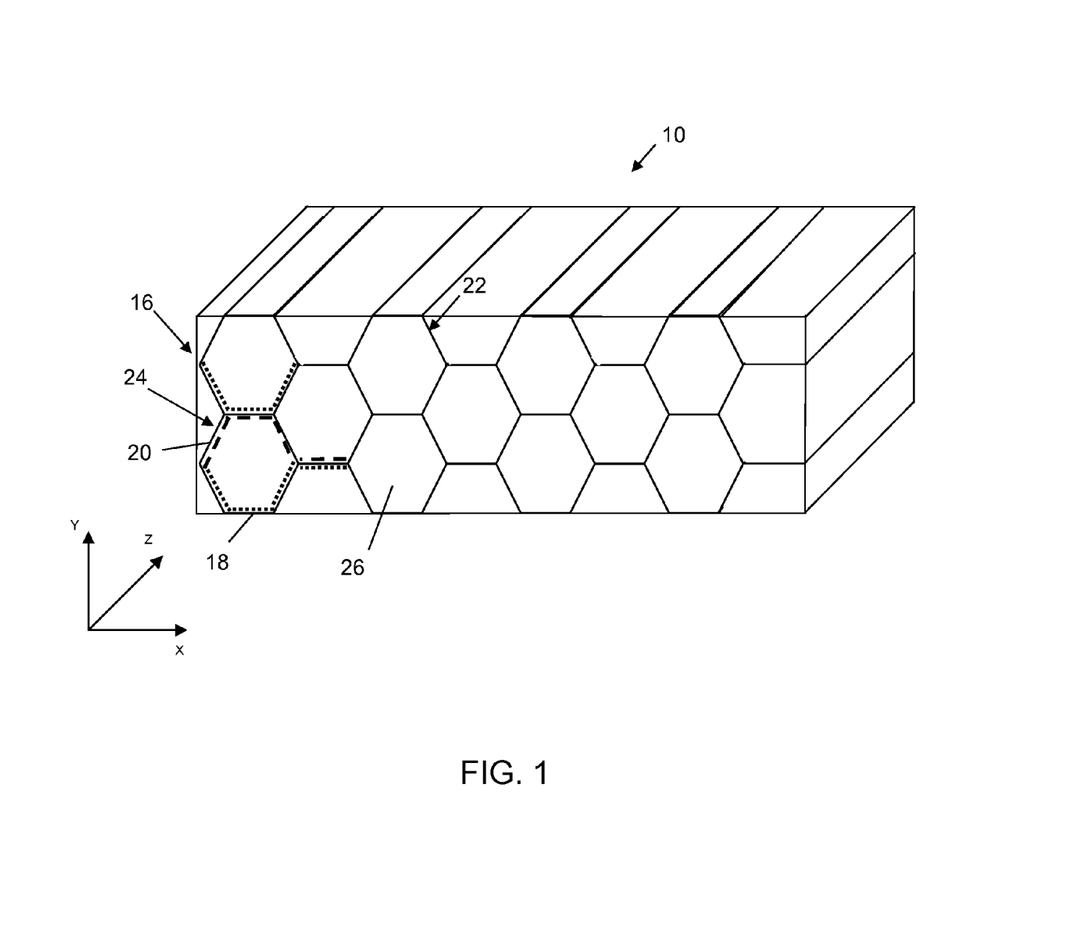
FIG. 1 illustrates a schematic representation of a web structure material.

FIG. 1 illustrates a schematic representation of a material, such as a web structure material 10. The web structure material 10 includes a web structure 16 formed from at least a first material layer 18 and a second material layer 20 to define a set of openings or cells 22 having cell walls 24 and a filler material 26.

The first and second material layers 18, 20 extend along both the x-axis and z-axis. For example, the first material layer 18 extends along both the x-axis and z-axis of the web structure 16 as indicated by the first dashed line shown in FIG. 1 while the second material layer 20 extends along both the x-axis and z-axis of the web structure 16 as indicated by the second dashed line shown in FIG. 1. While the first and second material layers 18, 20 can be formed from a variety of materials, in one arrangement, the first and second material layers 18, 20 are formed from a fabric material, such as woven nylon, fiberglass, or KEVLAR, as available form DuPont, saturated with a thermosetting resin, such as a phenolic resin or an epoxy. As will be described in detail below, when exposed to a thermal setting process, the thermosetting resin within the material layers 18, 20 reacts, flows, and cures the material layers 18, 20 into a single, unitary web structure 16.

The cell walls 24 of the web structure 16 extend along the z-axis, as illustrated. For example, in one arrangement, the cell walls 24 extend along the z-axis for a length of between about 7 inches (17.8 cm) and 10 inches (25.4 cm). While the web structure 16 can define any number of cells 22, in one arrangement, for a sheet of web structure material 10 having a length along the x-axis of about 16 feet and a thickness along the y-axis of between about 2.0 inches (5.1 cm) and 2.5 inches (6.3 cm), the web structure defines about 300,000 individual cells 22. While the cell walls 24 of the web structure 16 can have a variety of geometries, in the arrangement illustrated, each cell wall 24 is configured to define a hexagonally or honeycomb-shaped shaped cell 22 having a width of about ⅜ inch (0.952 cm) between the flats of parallel cell walls.

The filler material 26 is configured with material properties that depend upon the application of the web structure material 10. For example, in one arrangement, when the web structure material 10 is configured as a heat shield, each cell 22 contains a thermal insulation material, such as AVCOAT 5026-39 insulation, available from Textron Systems Corp. of Wilmington, Mass. Alternately, in the case where the web structure material 10 is used as a structural support, each cell 22 can contain structurally supportive material such as carbon or graphite fiber reinforced composite materials.

Figure 2:
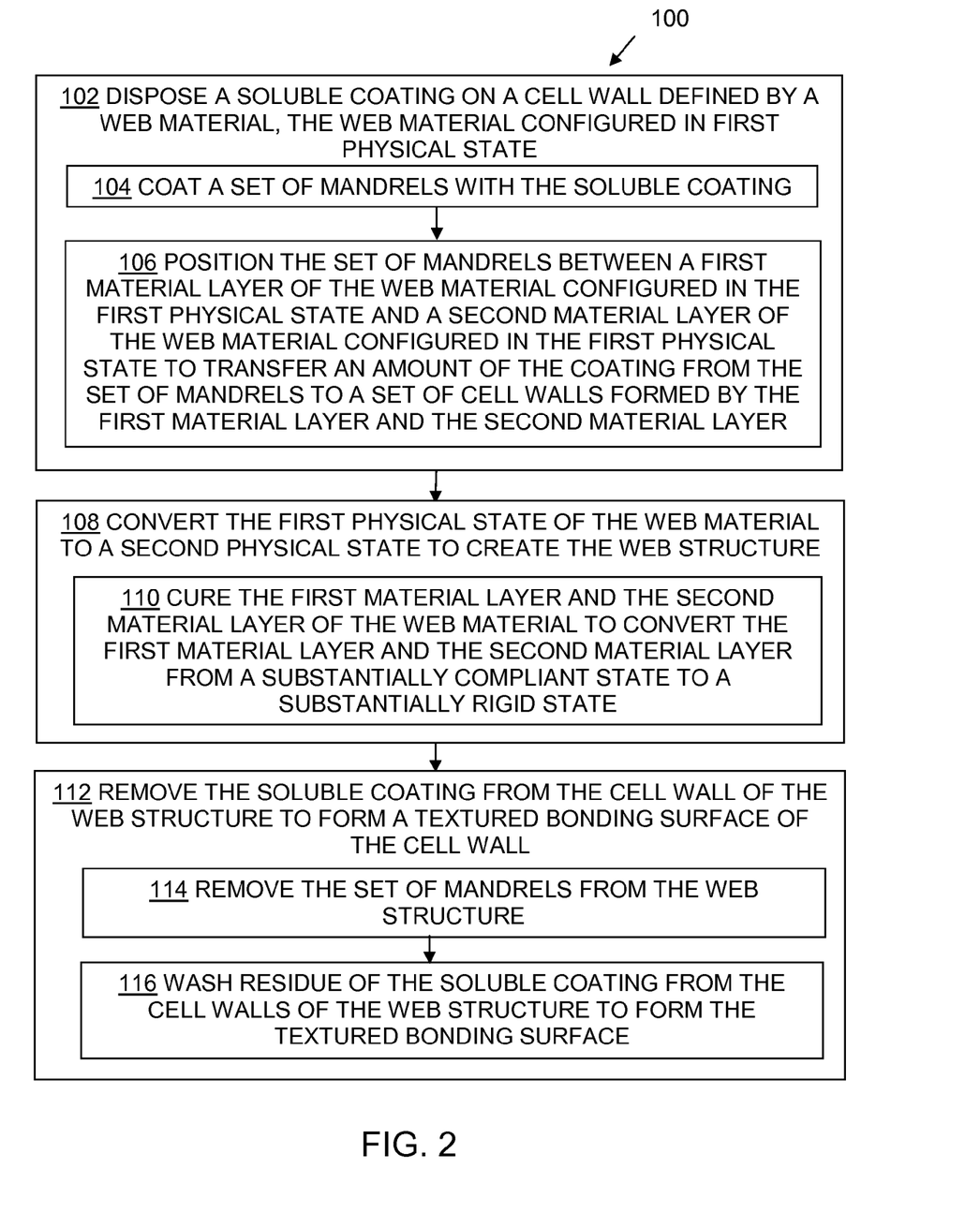
FIG. 2 illustrates an example method for manufacturing a web structure of the web structure material of FIG. 1.

During manufacturing, the web structure 16 is formed by a molding process using a set of pins or mandrels. In order to provide adequate bonding between the filler material 26 and the cell walls 24 of the web structure 16, conventionally, the assembler utilizes a leachable or soluble coating in conjunction with mandrels or pins that have been coated with a release agent to allow the mandrels to be easily removed from the resulting call walls 24, as will be described below. FIG. 2 is a flowchart 100 illustrating an example method preparing the surface of a material, such as during the manufacture of the web structure 16 of FIG. 1.

In step 102, an assembler disposes a soluble coating on a cell wall 24 defined by a web material, the web material configured in first physical state. For example, with respect to manufacture of the web structure material 10 of FIG. 1, the assembler disposes the soluble coating on the web material 18, 20 during the process of forming the cell walls 24 of the web structure 16.

In one arrangement, the assembler initially places a first material layer 18 saturated with a thermosetting resin on a table having a series of precisely spaced parallel slots. In its initial physical sate, the first material layer 18 is substantially compliant such that the first material layer 18 conforms to the slots formed in the table. The assembler then coats an exterior surface of a set of release-coated or removable mandrels with the soluble coating, as indicated in step 104, such as by using a dipping, spraying or taping process. While the soluble coating can have a variety of configurations, the soluble coating can be configured as a water soluble gel-coat material, such as polyvinyl alcohol (PVA) or polyvinylpyrrolidone (PVP) or as a solvent soluble gel-coat material, such as polystyrene or polyvinyl chloride.

Figure 3:
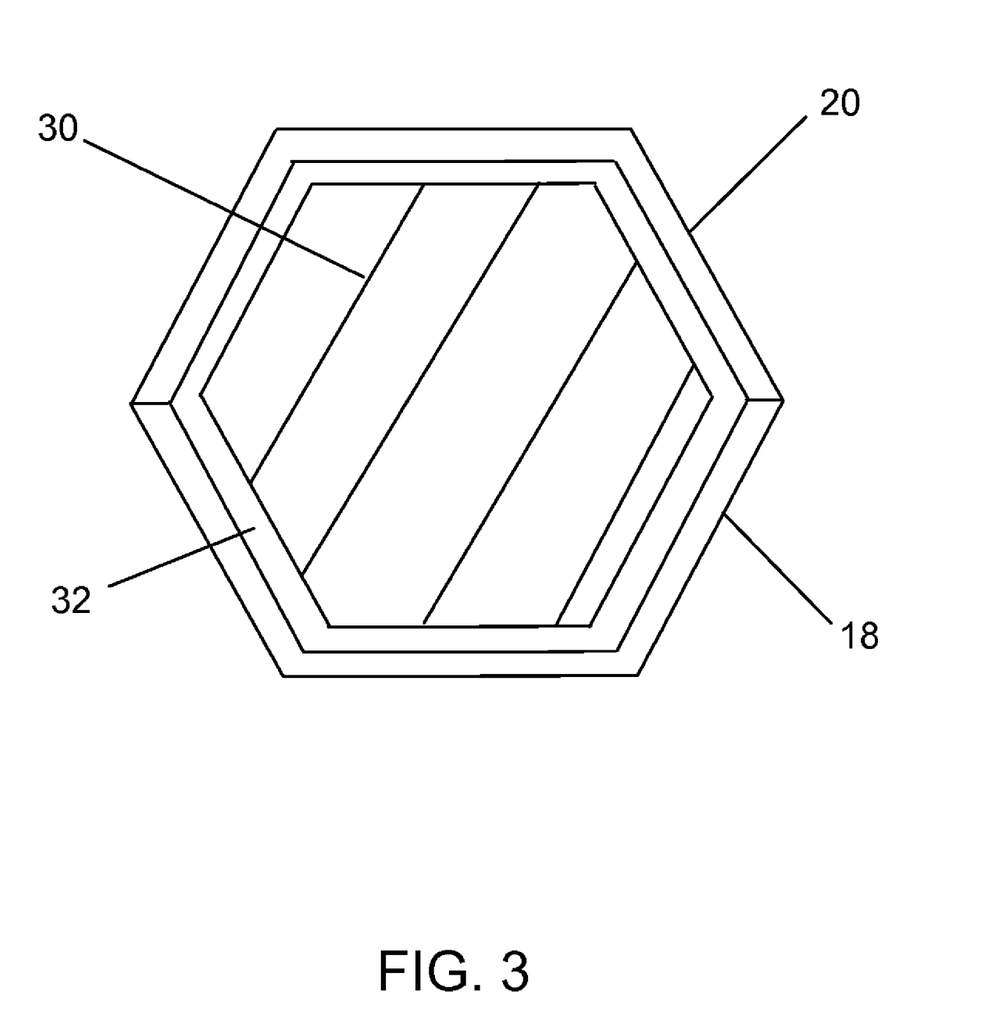
FIG. 3 illustrates a sectional view of a first material layer and a second material layer having a mandrel disposed therebetween.

Next, as indicated in FIG. 106, the assembler positions the set of mandrels between the first material layer 18 of the web material configured in the first physical state and the second material layer 20 of the web material configured in the first physical state to transfer an amount of the coating from the set of mandrels to a set of cell walls 24 formed by the first material layer 18 and the second material layer 20. For example, the assembler positions a set of coated hexagonally-shaped mandrels over the first material layer 18 and pushes the mandrels into the slots so that the first material layer 18 conforms to the contours of the table. Next, the assembler places a substantially compliant second material layer 20 over the row of mandrels and disposes a second row of coated mandrels over the second material layer 20 to cause the second material layer 20 to conform to the slots formed by the underlying first row of mandrels. With such interleaving of the coated mandrels with the first and second material layers 18, 20, the mandrels 30 transfer an amount of the soluble coating 32 to the cell walls 24 formed by the first material layer and the second material layer 18, 20, as illustrated in FIG. 3. The assembler can then place additional first and second material layers 18, 20 and coated mandrels thereon to form an assembly block and to build the thickness of the overall web structure material 10.

Returning to FIG. 2, in step 108, the assembler converts the first physical state of the web material to a second physical state to create the web structure 16. For example, to provide stability to the web structure material 10, the assembler causes the substantially compliant material layers 18, 20 to become substantially rigid. In one arrangement, once the assembler has added the appropriate number of layers for the web structure material 10, the assembler places a top plate onto the assembly block. The top plate compresses the assembly block together to minimize movement of the material layers 18, 20 and to ensure contact between adjacent material layers 18, 20. The assembler then heats the assembly block to cure the thermosetting resin carried by the material layers 18, 20. For example, as indicated in step 110, the assembler applies heat (e.g., 200 to 250 degrees Fahrenheit) to the material layers 18, 20 to cure the thermosetting resin, thereby hardening the material layers 18, 20 and causing the contacting first and second material layers 18, 20 to bond with each other to form the web structure 16. The cure temperature and time are defined by the specific materials that form the material layers 18, 20. Once the web structure 16 has cured, the assembler removed the mandrels and allows the web structure 16 to cool for a period of time.

Figure 4:
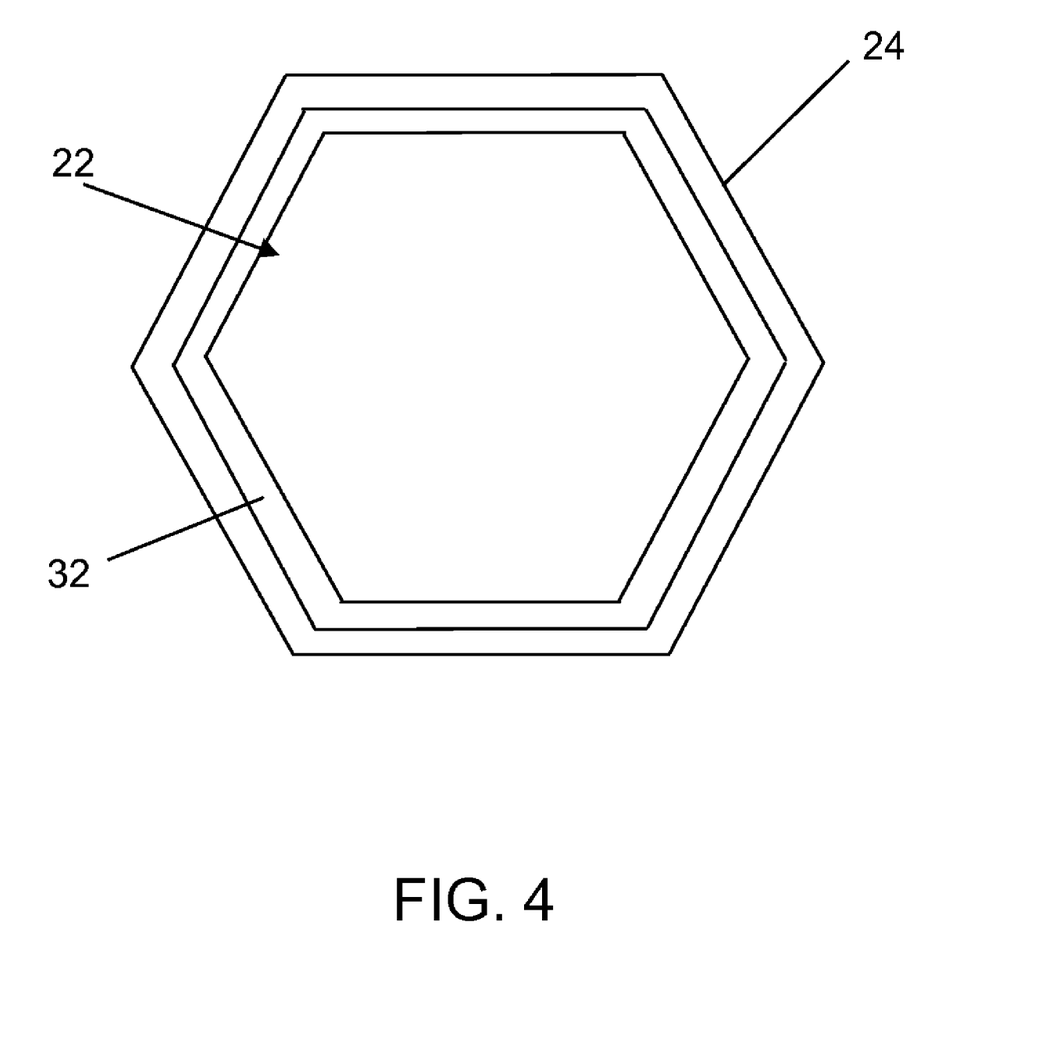
FIG. 4 illustrates a sectional view of a cell wall formed by the first material layer and a second material layer of FIG. 3 having the soluble coating disposed thereon.

A resulting cell wall 24 from the curing process is illustrated in FIG. 4. With the cell wall 24 formed, the assembler removes the mandrels from the web structure and the soluble coating 32 remains on the cell wall 24. The coating 32 acts as a protective layer or film to minimize contamination of the cell wall 24 until the assembler is ready to bond the wall 24 to another material, such as the filler material 26.

Figure 5:
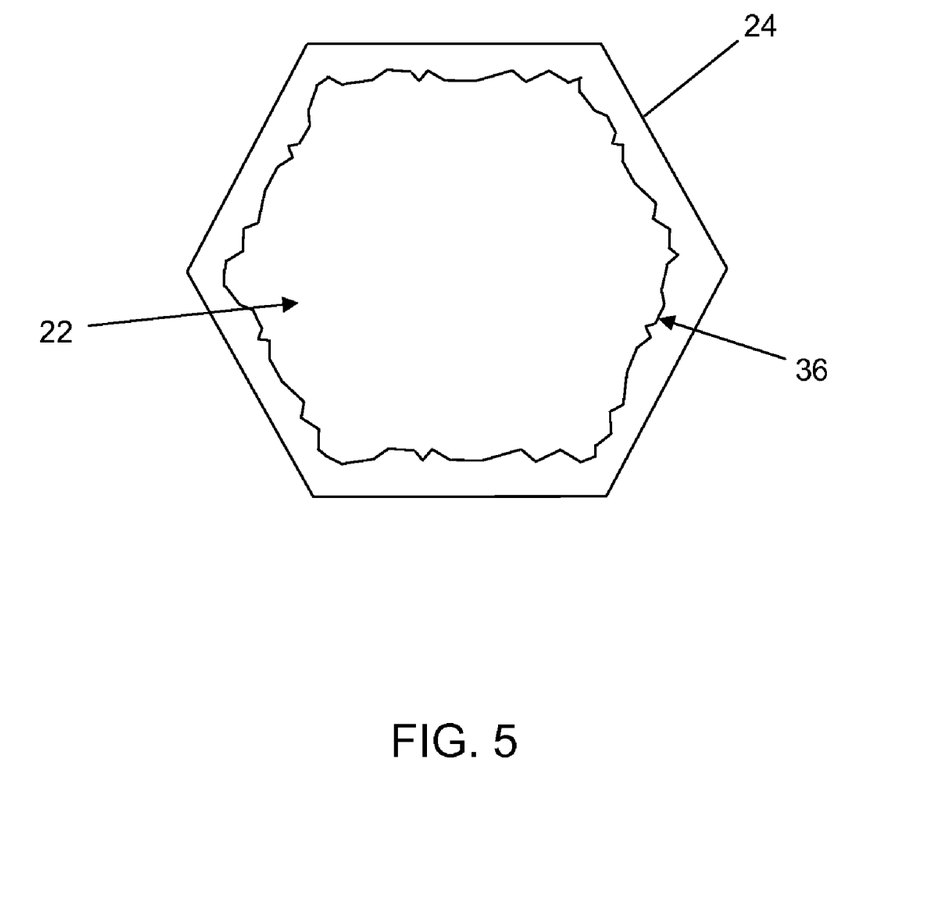
FIG. 5 illustrates a sectional view of the cell wall of FIG. 4 having the soluble coating removed.

Returning to FIG. 2, in step 112, the assembler removes the soluble coating 32 from the cell wall 24 of the web structure 16 to form a textured bonding surface of the cell wall 24. For example, once the web structure 16 has cooled and cured, as indicated in step 114, the assembler removes the mandrels from the web structure, leaving cells 22. The mandrels 30 leave behind soluble coating residue 32 that the assembler removes to allow adherence between the cell walls 24 and the filler material 26. In one arrangement, as indicated in step 116, the assembler then washes the soluble coating residue 32 from the cell walls 24 of the web structure 16 to form the textured bonding surface, such as illustrated in FIG. 5. By washing the soluble coating residue from the cell walls 24 the assembler dissolves the soluble coating residue 32 to leave behind or expose the resulting textured bonding surface 36. In one arrangement, when the soluble coating is formed of a water-soluble material, such as polyvinyl alcohol (PVA) or polyvinylpyrrolidone (PVP), the assembler rinses the web structure 16 with water to remove and dissolve the soluble coating from the interior walls 24 of each cell 22. In another arrangement, when the soluble coating is formed of a solvent-soluble material, such as such as polystyrene or polyvinyl chloride (PVC), the assembler rinses the web structure 16 with a solvent to remove and dissolve the soluble coating from the interior walls 24 of each cell 22.

Figure 6:
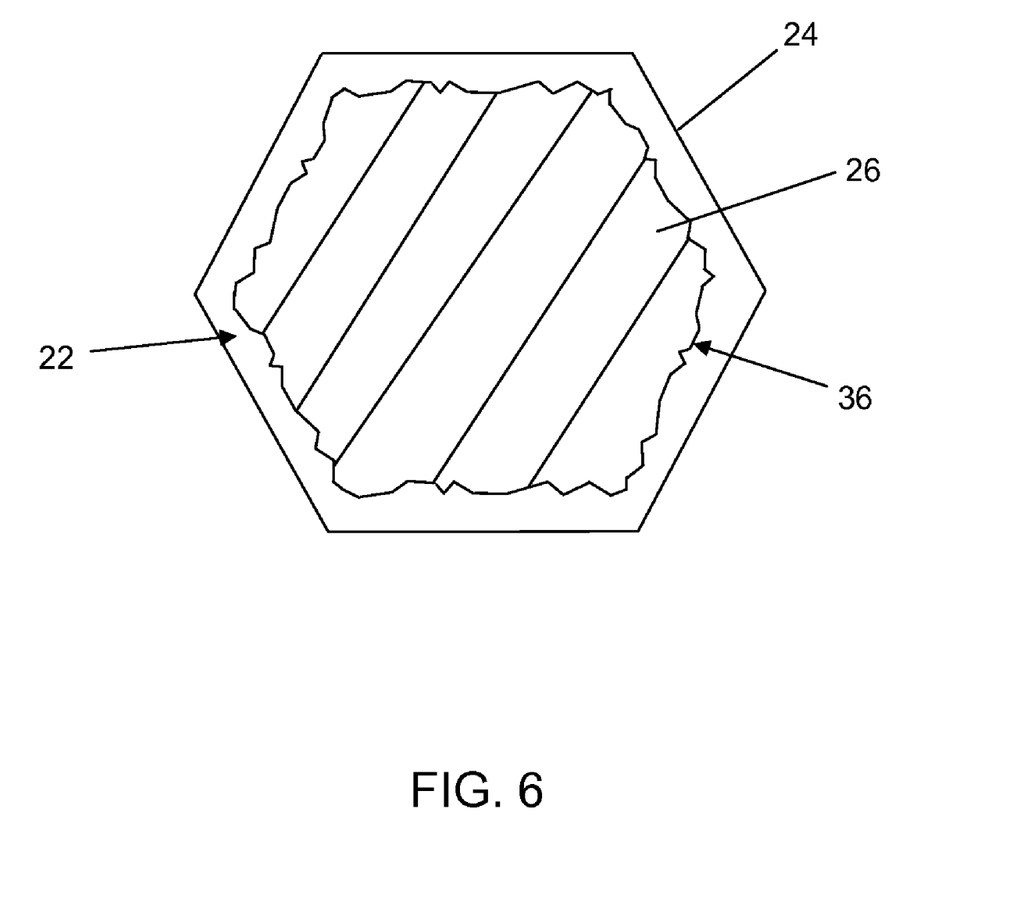
FIG. 6 illustrates a sectional view of the cell wall of FIG. 4 having a filler material disposed within a cell defined by the cell wall.

With the web structure 16 formed, the assembler can then inject the filler material within each cell 22 defined by the cell wall structure 24. For example, with reference to FIG. 6, the assembler injects filler material 34, such as thermal insulation material, within a cell 22. As the filler material 34 enters the cell 22, the filler material 34 interacts with the textured bonding surface 36 of the cell wall 24. For example, the filler material 34 enters crevices of the textured bonding surface 36 of the interior walls of the cell 24 to secure the filler material 34 to the cell wall 24. Such interaction minimizes loosening of the filler material 34 relative to the cell wall 24 during use, thereby minimizing degradation and failure of the web structure material 10.

Accordingly, the soluble layer used during the manufacturing of the web structure 16 is easily-removable from the web structure 16 and helps to generate a roughly textured surface of each cell wall 24. Additionally, because the soluble layer provides a textured bonding surface the use of the soluble layer enhances the bondability of any surface that requires good adhesion where the surface is difficult to reach for conventional surface preparation techniques, such as sanding or chemical etching.

As indicated above, the soluble coating can be configured as a water soluble gel-coat material, such as polyvinyl alcohol (PVA) or as a solvent soluble gel-coat material, such as polyvinyl chloride (PVC), which upon dissolution, generates a roughly textured surface the cell walls 24 of the web structure 16. In one arrangement, an assembler selects the soluble coating in order to react the soluble coating with the thermosetting resin of the material layers 18, 20 to provide dangling functional groups that can further enhance adhesion with the filler material 26. For example, PVA is configured to substantially co-cure with the thermosetting resins carried by the material layers during the curing process and generate functional groups on the inner cell walls 24 of the web structure 16. These functional groups have a bonding affinity with the filler material 26, such as such as AVCOAT 5026-39. Accordingly, when the assembler injects the filler material 26 into each cell 22 of the web structure 16, the filler material 26 chemically reacts with and bonds to the functional groups carried by the cell walls 24 to secure the filler material to the cell walls 24 of the web structure 16.

Figure 7:
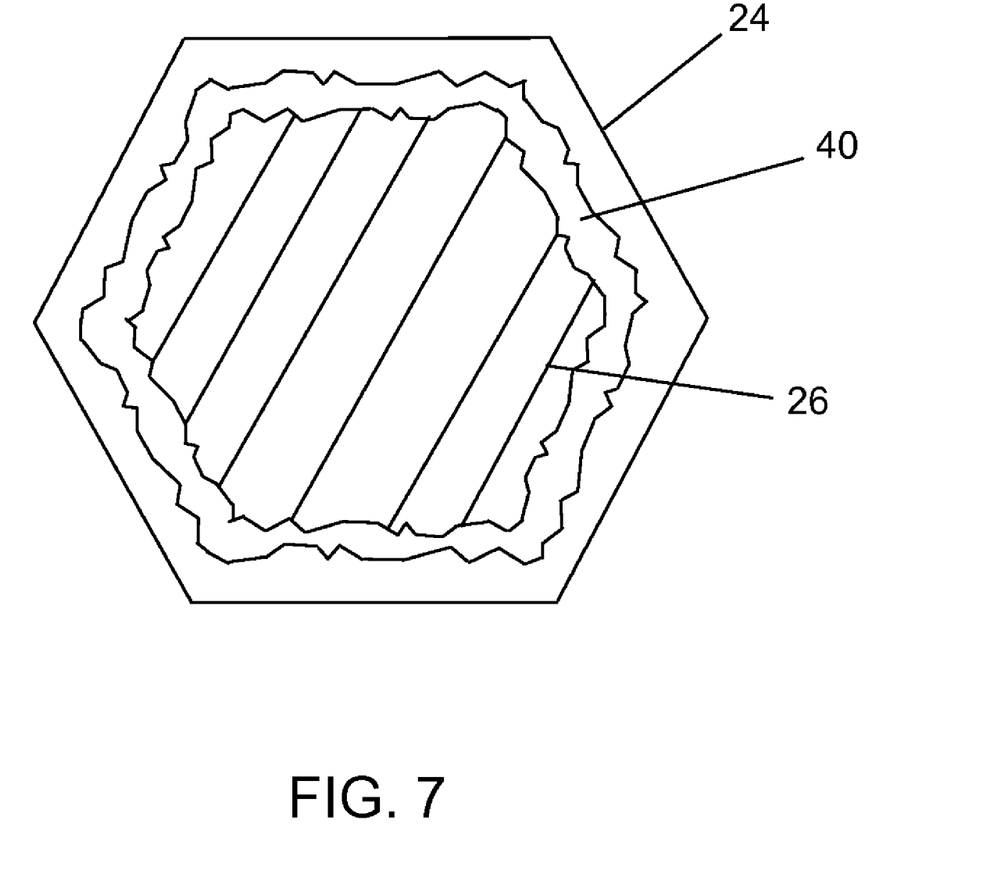
FIG. 7 illustrates a sectional view of the cell wall of FIG. 4 having a coupling agent and a filler material disposed within the cell defined by the cell wall.

In one arrangement, as illustrated in FIG. 7, to enhance bonding of the filler material 26 to the web structure 16, prior to injecting the filler material 26 within each cell 22 of the web structure 16, the assembler applies a coupling agent 40 to each cell 24 of the web structure 16. While a variety of coupling agents 40 can be utilized to enhance such bonding, in one arrangement, the assembler applies 3-glycidoxypropyltrimethoxy silane (Dow Corning Z-6040) from Sigma-Aldrich to the cell walls 24 to enhance bonding. Alternatively, the coupling agent can be added to the gel-coat material so that it reacts with the cell-wall matrix resin and enhances bonding when the soluble portion is washed away.

While various embodiments of the invention have been particularly shown and described, it will be understood by those skilled in the art that various changes in form and details may be made therein without departing from the spirit and scope of the invention as defined by the appended claims.

As described above, an assembler can select a particular soluble coating in the manufacturing process in order to react the soluble coating with the thermosetting resin of the material layers 18, 20 to provide dangling functional groups that can further enhance adhesion with the filler material 26. Such description is by way of example only. In one arrangement, the assembler selects the soluble coating such that the coating reacts with the thermosetting resin of the material layers 18, 20 to provide a set of dangling functional groups that can further enhance adhesion with the coupling agent 40. For example, in such a case, when the assembler applies the coupling agent 40 as an additive or directly to the textured bonding surface, the coupling agent 40 chemically interacts with the set of functional groups to secure the coupling agent 40 to the cell wall 24 of the web structure 16. The assembler then disposes the filler material 26 within the cells 22, such that the filler material 26 interacts with the coupling agent 40 to secure the filler material 26 to the web structure 16.

As described above, the cell walls 24 of the web structure 16 are configured to define a hexagonally or honeycomb-shaped shaped cell 22. Such description is by way of example only. The cell walls 24 can be configured to define a variety of shapes and sizes, such as rectangular, circular, or sextagonally-shaped cells 22.

As illustrated in FIG. 1, the cells 22 of the web structure 16 extend along the z-axis in a substantially linear manner. In one arrangement, the cells 22 can have a variety of shapes. For example, the cells 22 can be tapered along the z-axis direction. Alternately, the cells 22 can be curved relative to a z-x plane, a y-z plane, or a y-z plane.

As described above, FIG. 2 is a flowchart 100 illustrating an example method preparing the surface of a material, such as during the manufacture of the web structure 16 of FIG. 1. Such description is by way of example only. The method for preparing the surface of a material, such as by forming temporary protective coatings and bondable surfaces, can be applied to any surface, regardless of the geometric configuration of the material.

What is claimed is:

1. A method for forming a web structure, comprising: coating a set of mandrels with a soluble coating; positioning the set of mandrels between a first material layer of a web material and a second material layer of the web material; curing the first material layer and the second material layer of the web material to generate the web structure; wherein the first material layer and the second material layer include a thermosetting resin; wherein the method further comprises: prior to positioning the set of mandrels, placing the first material layer onto a table having a set of slots; positioning a first subset of mandrels of the set of mandrels on the first material layer and over the set of slots; and pushing the mandrels into the slots, the mandrels causing, upon being pushed into the slots, the first material layer to conform to the table; and removing the set of mandrels from the web structure; and removing the soluble coating from the cell wall of the web structure to form a textured bonding surface of the cell wall.

2. The method of claim 1, wherein removing the soluble coating from the cell wall of the web structure to expose the textured bonding surface of the cell wall comprises using water to rinse residue of the soluble coating from the cell walls of the web structure to expose the textured bonding surface, the soluble coating configured as a water-soluble coating.

3. The method of claim 1, further comprising disposing a filler material within at least one cell defined by the web structure, the filler material interacting with the textured bonding surface of the cell wall of the at least one cell to secure the filler material to the web structure.

4. The method of claim 3, wherein disposing the filler material within the at least one cell defined by the web structure comprises disposing a thermal insulation material within the at least one cell defined by the web structure, the a thermal insulation material interacting with the textured bonding surface of the cell wall of the at least one cell to secure the a thermal insulation material to the web structure.

5. The method of claim 1, comprising:
applying a coupling agent to the textured bonding surface of the cell wall of at least one cell defined by the web structure; and
disposing a filler material within at least one cell defined by the web structure, the filler material interacting with the coupling agent and the textured bonding surface of the cell wall of the at least one cell to secure the filler material to the web structure.

6. The method of claim 1, comprising:
reacting the soluble coating with the cell wall of at least one cell defined by the web material to generate a set of functional groups carried by the textured bonding surface of the cell wall; and
disposing a filler material within the at least one cell defined by the web structure, the filler material interacting with the set of functional groups carried by the textured bonding surface of the cell wall to secure the filler material to the web structure.

7. The method of claim 1, comprising:
reacting the soluble coating with the cell wall of at least one cell defined by the web material to generate a set of functional groups carried by the textured bonding surface of the cell wall;
applying a coupling agent to the textured bonding surface of the cell wall of at least one cell defined by the web structure, the coupling agent bonding with the set of functional groups carried by the textured bonding surface of the cell wall; and
disposing a filler material within at least one cell defined by the web structure, the filler material interacting with the coupling agent to secure the filler material to the web structure.

8. The method of claim 1, wherein positioning the set of mandrels between the first material layer and the second material layer includes: placing the second material layer over the first subset of mandrels positioned on the first material layer; and positioning a second subset of mandrels of the set of mandrels on the second material layer, the mandrels causing the second material layer to conform to slots formed by the first subset of mandrels.

9. The method of claim 8, wherein curing the first material layer and the second material layer includes: applying heat to the thermosetting resin of the first material layer and the second material layer.

10. The method of claim 3, wherein the filler material includes AVCOAT 5026-39; and wherein disposing the filler material within the at least one cell defined by the web structure includes:

injecting the filler material into the at least one cell.

\* \* \* \* \*